US012614554B2

(12) United States Patent
Onat

(10) Patent No.: US 12,614,554 B2
(45) Date of Patent: Apr. 28, 2026

(54) ERROR CORRECTION OVERWRITE FOR AUDIO ARTIFACT REDUCTION

(71) Applicant: SEMICONDUCTOR COMPONENTS INDUSTRIES, LLC, Phoenix, AZ (US)

(72) Inventor: Erkan Onat, Waterdown (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 644 days.

(21) Appl. No.: 17/739,908

(22) Filed: May 9, 2022

(65) Prior Publication Data

US 2023/0055690 A1     Feb. 23, 2023

Related U.S. Application Data

(60) Provisional application No. 63/260,430, filed on Aug. 19, 2021.

(51) Int. Cl.
| | |
|---|---|
| *G10L 19/005* | (2013.01) |
| *H04L 65/75* | (2022.01) |
| *H04L 65/80* | (2022.01) |
| *H04R 25/00* | (2006.01) |

(52) U.S. Cl.
CPC ............ *G10L 19/005* (2013.01); *H04L 65/75* (2022.05); *H04L 65/80* (2013.01); *H04R 25/554* (2013.01)

(58) Field of Classification Search
CPC .................................................. G10L 19/005
See application file for complete search history.

(56) References Cited

U.S. PATENT DOCUMENTS

| | | | | |
|---|---|---|---|---|
| 6,456,719 | B1* | 9/2002 | Yuh ........................ | G10L 19/005 |
| | | | | 704/201 |
| 7,430,255 | B2 | 9/2008 | Shibuya et al. | |
| 8,601,338 | B2 | 12/2013 | Kolze | |
| 8,649,523 | B2 | 2/2014 | Chau | |
| 2002/0069038 | A1* | 6/2002 | Cooper ................. | H04L 1/0009 |
| | | | | 702/191 |
| 2004/0057586 | A1* | 3/2004 | Licht ........................ | H03G 3/32 |
| | | | | 381/94.1 |
| 2007/0041117 | A1* | 2/2007 | Saliba ...................... | G11B 5/78 |
| 2007/0208791 | A1* | 9/2007 | Short ...................... | H04L 9/001 |
| | | | | 708/203 |

(Continued)

OTHER PUBLICATIONS

David L. Cohn et al., "The Relationship Between an Adaptive Quantizer and a Variance Estimator," IEEE Transactions on Information Theory, Nov. 1975, pp. 669-671.

(Continued)

*Primary Examiner* — Daniel C Washburn
*Assistant Examiner* — Paul J. Mueller
(74) *Attorney, Agent, or Firm* — Ramey LLP

(57) ABSTRACT

Audio communication methods, devices, and systems, are provided with error correction overwrite for audio artifact reduction. One illustrative low-latency audio streaming method includes: receiving packets of digital audio data; applying an error correction code decoder to obtain a data stream that includes error-corrected data samples; providing a correction-limited data stream by replacing any of the error-corrected data samples that are outliers; and converting the correction-limited data stream into an audio signal.

20 Claims, 3 Drawing Sheets

(56) References Cited

U.S. PATENT DOCUMENTS

| 2012/0243710 A1 | 9/2012 | Chau | |
|---|---|---|---|
| 2013/0002797 A1* | 1/2013 | Thapa | H04M 3/568 |
| | | | 348/E7.083 |
| 2014/0197307 A1* | 7/2014 | Jorion | G01T 1/17 |
| | | | 250/252.1 |
| 2017/0289357 A1* | 10/2017 | Li | H04M 3/568 |
| 2017/0330572 A1 | 11/2017 | Johnston et al. | |
| 2019/0246221 A1* | 8/2019 | Shariati | H04N 21/00 |
| 2020/0089724 A1* | 3/2020 | Zimovnov | G06Q 30/0631 |
| 2021/0006924 A1* | 1/2021 | Terentiv | H04S 7/307 |

OTHER PUBLICATIONS

Gediminas Simkus, et al., "Error Robust Delay-Free Lossy Audio Coding Based on ADPCM," Proc. of the 16th Int. Conference on Digital Audio Effects (DAFx-13), Maynooth, Ireland, Sep. 2-5, 2013, 8 pages.
Gediminas Simkus, et al., "Error Resilience Enhancement for a Robust Adpcm Audio Coding Scheme," 2014 IEEE International Conference on Acoustic, Speech and Signal Processing (ICASSP), IEEE 978-1-4799-2893—Apr. 14, 2014, pp. 3685-3689.

* cited by examiner

Fig. 1
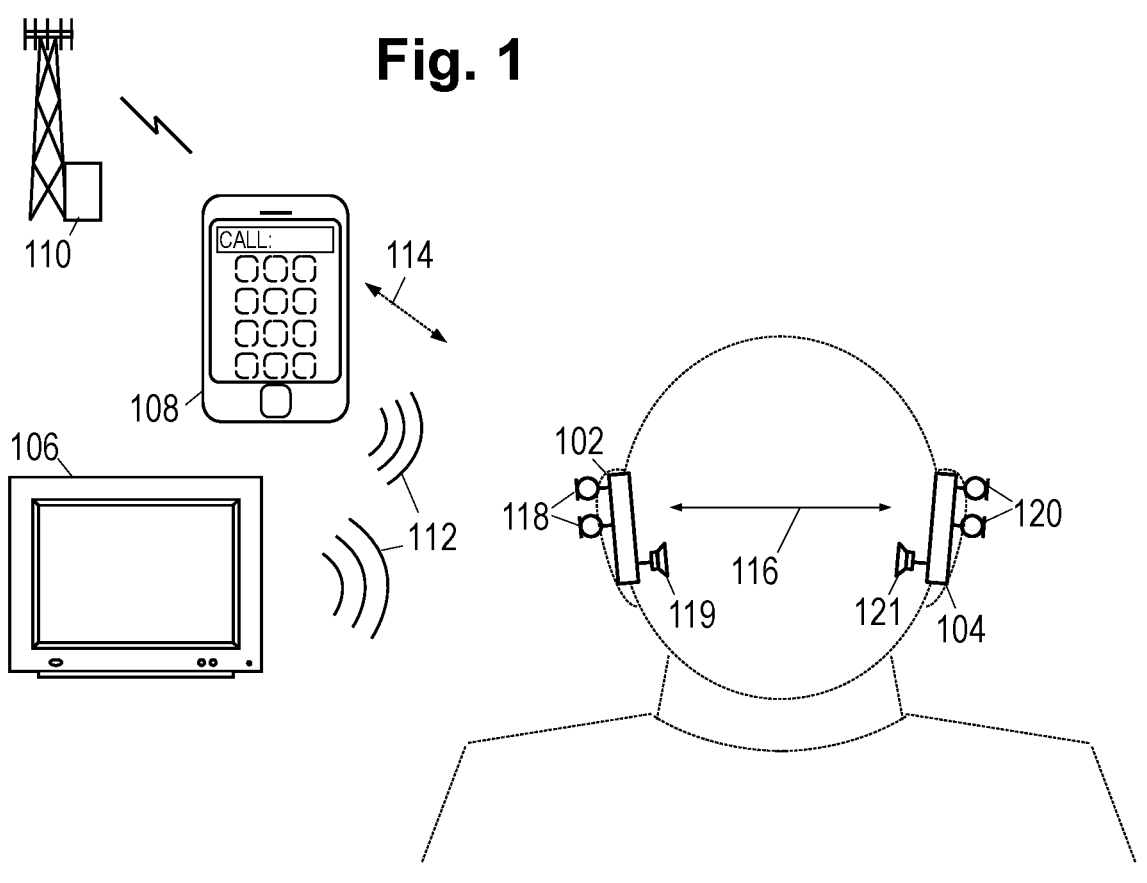
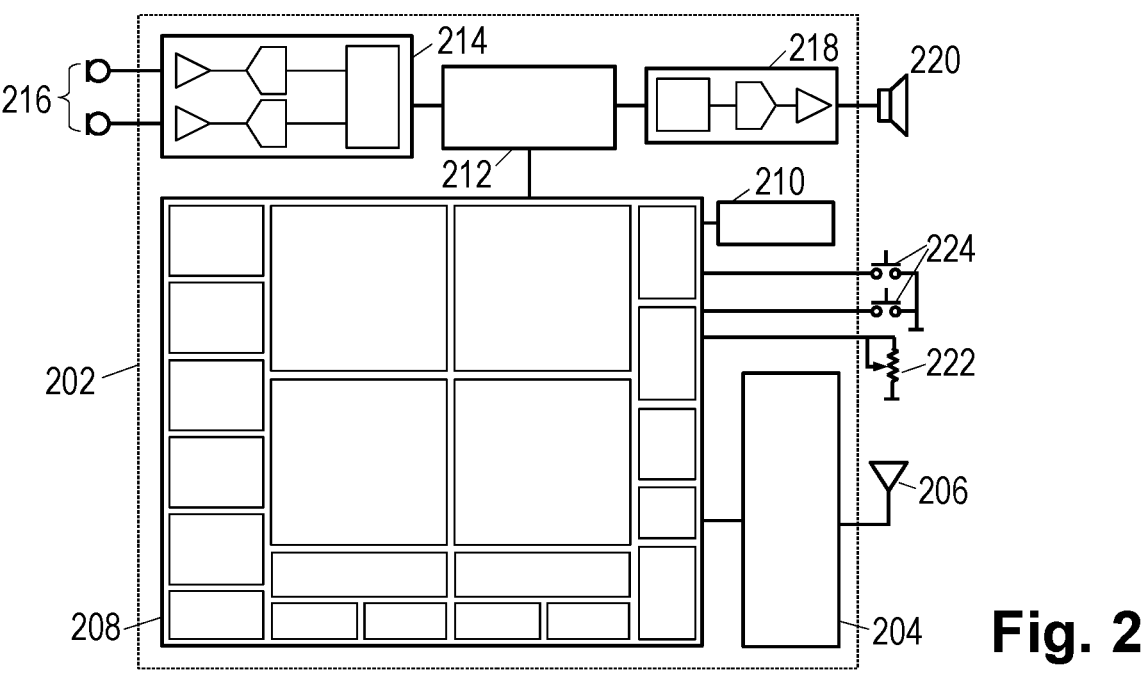
Fig. 2

ERROR CORRECTION OVERWRITE FOR AUDIO ARTIFACT REDUCTION

CROSS-REFERENCE TO RELATED APPLICATIONS

The present application claims priority to Provisional U.S. Application 63/260,430, filed 2021 Aug. 19 and titled "Error Correction Overwrite for Audio Communication" by inventor Erkan Onat, which is hereby incorporated herein by reference.

BACKGROUND

There are many situations where it is necessary or desirable for audio communication to occur with low latency in limited bandwidth environments where interference can cause data transmission errors. As one example, modern hearing aids and other hearable devices support low latency audio communication with various electronic devices. Error correction techniques can be employed to detect and correct data transmission errors, at the cost of increased data payload overhead requiring increased bandwidth, latency, and/or data processing complexity. These considerations may limit the achievable degree of error detection and correction.

Current systems with forward error correction (FEC), such as Hamming encoders, can usually cope with correcting single bit errors in a given data packet, or optionally detecting up to two bit errors, but may be unable to reliably detect or correct errors beyond this limit. The bit error rates in typical usage environments may be expected to provide satisfactory performance when the bit errors are statistically independent, but it is observed that this assumption is frequently unjustified. In many environments, errors tend to occur in bursts that predictably defeat the capabilities of usable error correction codes, causing errors to remain undetected or to become improperly corrected.

SUMMARY

Accordingly, there are disclosed herein audio communication methods, devices, and systems, having error correction overwrite for audio artifact reduction. One illustrative low-latency audio streaming method includes: receiving packets of digital audio data; applying an error correction code decoder to obtain a data stream that includes error-corrected data samples; providing a correction-limited data stream by replacing any of the error-corrected data samples that are outliers; and converting the correction-limited data stream into an audio signal.

An illustrative audio streaming device includes: an error correction code decoder that produces a data stream having error-corrected data samples; a correction limiter that provides a correction-limited data stream by replacing any of the error-corrected data samples that are outliers; and a decompressor that converts the correction-limited data stream into an audio signal.

The foregoing device and method are suitable for application to hearing aids that support contralateral routing of signals (CROS) between ears. A first hearing aid for a first ear may include: a microphone to capture and digitize an input audio signal; a transmit chain that compresses the digitized audio signal into packets of digital audio data with error correction code protection; and a first wireless transceiver that operates to transmit the packets of digital audio data. A second hearing aid for the second ear may include: a second wireless transceiver that operates to receive said packets of digital audio data; an error correction code decoder that produces a data stream having error-corrected data samples; a correction limiter that provides a correction-limited data stream by replacing any of the error-corrected data samples that are outliers; and a decompressor that converts the correction-limited data stream into an audio signal.

Each of the foregoing embodiments may be employed separately or conjointly, and may optionally include one or more of the following features in any suitable combination: 1. said providing includes: deriving a threshold from the correction-limited data stream; and replacing the error-corrected data samples that exceed the threshold. 2. said deriving includes: calculating an error between a previous envelope value and a magnitude of a current data sample; and estimating a current envelope value as a weighted sum based on the error and the previous envelope value. 3. the weighted sum includes a constant offset. 4. the weighted sum scales the error by a factor that depends at least in part on the error. 5. the weighted sum scales the error by a factor that depends at least in part on the previous envelope value. 6. the factor increases for as the previous envelope value decreases. 7. said estimating includes limiting the weighted sum to a predetermined range. 8. the threshold is proportional to the previous envelope value. 9. the error-corrected data samples that exceed the threshold are replaced with a predetermined fraction of the previous envelope value. 10. an envelope estimation circuit having: a difference element to calculate an error between a previous envelope value and a magnitude of a current data sample; and a summation element to calculate a current envelope value based on the error and the previous envelope value. 11. a compare and select (CAS) circuit having: a comparator that compares the current data sample to a threshold based on the previous envelope value; and a selector that replaces any of the error-corrected data samples that exceed the threshold.

BRIEF DESCRIPTION OF THE DRAWINGS

FIG. 1 is an environmental view of an illustrative wireless audio communication system.

FIG. 2 is an integrated circuit layout diagram of an illustrative wireless audio device.

DETAILED DESCRIPTION

Figure 3:
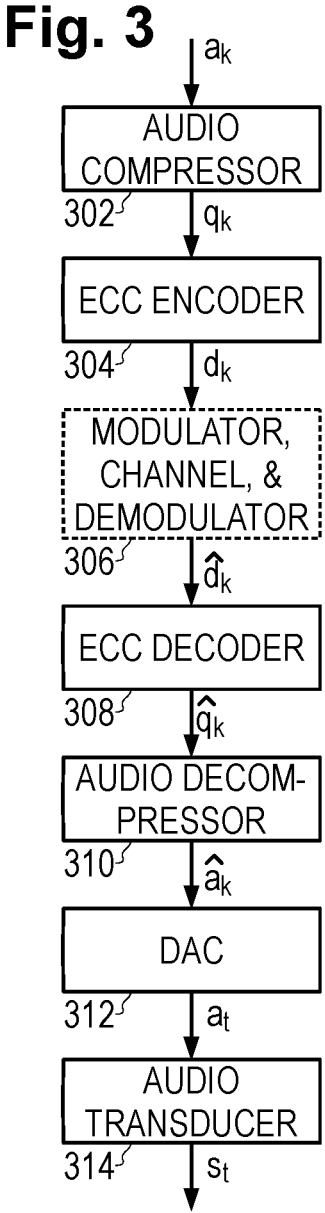
FIG. 3 is a data flow diagram for an illustrative audio communication system without a correction limiter.

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

The present disclosure is best understood in light of a suitable application. As context, FIG. 1 shows an illustrative wireless audio communication system. The illustrative system includes two wireless audio devices 102, 104, schematically illustrated here as hearing aids that support audio streaming, CROS, and/or BiCROS features, but other suitable wireless audio devices include headsets, body-mounted cameras, mobile displays, or other wireless devices that can receive or send a data stream from or to a media device using a wireless streaming protocol. Received data streams may be rendered as analog sound, vibrations, or the like. Also shown are two media devices 106, 108, and a network access point 110.

Illustrated media device 106 is a television generating sound 112 as part of an audiovisual presentation, but other sound sources are also contemplated including doorbells, (human) speakers, audio speakers, computers, and vehicles. Illustrated media device 108 is a mobile phone, tablet, or other processing device, which may have access to a network access point 110 (shown here as a cell tower). Media device 108 sends and receives streaming data 114 potentially representing sound to enable a user to converse with (or otherwise interact with) a remote user, service, or computer application. Arrays of one or more microphones 118 and 120 may receive sound 112, which the devices 102, 104 may digitize, process, and play through earphone speakers 119, 121 in the ear canal. The wireless audio devices 102, 104 employ a low latency streaming link 116 to convey the digitized audio between them, enabling improved audio signals to be rendered by the speakers 119, 121.

Various suitable implementations exist for the low latency streaming link 116, such as a near field magnetic induction (NFMI) protocol, which can be implemented with a carrier frequency of about 10 MHz is used. NFMI enables dynamic exchange of data between audio devices 102, 104 at low power levels, even when on opposite sides of a human head. Streaming data 114 is more typically conveyed via Bluetooth or Bluetooth Low Energy (BLE) protocols.

For CROS and BiCROS operation, the audio devices detect, digitize, and apply monaural processing to the sound received at that ear. One or both of the audio devices convey the digitized sound as a cross-lateral signal to the other audio device via the dedicated point-to-point link 116. The receiving device(s) apply a binaural processing operation to combine the monaural signal with the cross-lateral signal before converting the combined signal to an in-ear audio signal for delivery to the user's ear. Audio data streaming entails rendering ("playing") the content represented by the data stream as it is being delivered. CROS and audio data streaming employ wireless network packets to carry the data payloads to the target device. Channel noise and interference may cause packet loss, so the various protocols may employ varying degrees of buffering and redundancy, subject to relatively strict limits on latency. For example, latencies in excess of 20 ms are noticeable to participants in a conversation and widely regarded as undesirable. To support CROS and BiCROS features, very low latencies (e.g., below 5 ms end-to-end) are required to avoid undesirable "echo" effects. In energy-limited applications such as hearing aids, the latency requirements must be met while the operation is subject to strict power consumption limits.

FIG. 2 is a block diagram of an illustrative wireless audio device 202 that supports the use of a low-latency wireless streaming protocol suitable for CROS/BiCROS operation or other audio communication protocols. The audio device may be a hearing aid or wearable device, though the principles disclosed here are applicable to any wireless network device. Device 202 includes a radio frequency (RF) module 204 (at times referred to as a radio module) coupled to an antenna 206 to send and receive wireless communications. The radio module 204 is coupled to a controller 208 that sets the operating parameters of the radio module 204 and employs it to transmit and receive wireless streaming communications. The controller 208 is preferably programmable, operating in accordance with firmware stored in a nonvolatile memory 210. A volatile system memory 212 may be employed for digital signal processing and buffering.

A signal detection unit 214 collects, filters, and digitizes signals from local input transducers 216 (such as a microphone array). The detection unit 214 further provides direct memory access (DMA) transfer of the digitized signal data into the system memory 212, with optional digital filtering and downsampling. Conversely, a signal rendering unit 218 employs DMA transfer of digital signal data from the system memory 212, with optional upsampling and digital filtering prior to digital-to-analog (D/A) conversion. The rendering unit 218 may amplify the analog signal(s) and provide them to local output transducers 220 (such as a speaker or piezoelectric transducer array).

Controller 208 extracts digital signal data from the wireless streaming packets received by radio module 204, optionally buffering the digital signal data in system memory 212. As signal data is acquired by the signal detection unit 214, the controller 208 may collect it into data payloads for the radio module to frame and send, e.g., as cross-lateral data via the point-to-point wireless link 116. The controller 208 may provide forward error correction (FEC) encoding or some other form of error correction code protection against errors in transmitted data, and conversely may employ an error correction code decoder to detect bit errors in received data, correcting them if possible. Latency and power consumption restrictions may limit FEC complexity such that it protects only against isolated errors and remains vulnerable to burst errors which can cause undesirable audio artifacts such as spikes in audio signal amplitude often perceived as loud ticks or pops in the signal.

The controller 208 or the signal rendering unit 218 combines the acquired digital signal data with the wirelessly received signal data, applying filtering and digital signal processing as desired to produce a digital output signal which may be directed to the local output transducers 220. Controller 208 may further include general purpose input/output (GPIO) pins to measure the states of control potentiometers 222 and switches 224, using those states to provide for manual or local control of on/off state, volume, filtering, and other rendering parameters. At least some contemplated embodiments of controller 208 include a RISC processor core, a digital signal processor core, special purpose or programmable hardware accelerators for filtering, array processing, and noise cancelation, as well as integrated support components for power management, interrupt control, clock generation, and standards-compliant serial and parallel wiring interfaces.

The software or firmware stored in memories 210, 212, may cause the processor core(s) of the controller 208 to implement a low-latency wireless streaming method having error correction overwriting to reduce the occurrence of audio artifacts such as those caused by burst errors. Alternatively the controller 208 may implement this method using application-specific integrated circuitry.

FIG. 3 illustrates a typical data flow in an illustrative audio communication system. Prior to transmission, digitized audio signal samples $\alpha_k$ are compressed to reduce bandwidth requirements. An audio compressor 302 such as, e.g., an adaptive differential pulse code modulator (ADPCM) enables a stream of 24-bit audio signal samples $\alpha_k$ to be well represented as a stream of, e.g., 5-bit quantized errors $q_k$ measured relative to the output of a recursive prediction filter. Some systems enable the degree of compression to be varied, producing, e.g., quantized error resolutions ranging from 5- to 16-bits.

As the compression process removes most of the signal redundancy, a ECC encoder 304 re-introduces a controlled amount of redundancy to enable error detection and correction. As one example, four Hamming parity polynomial bits can be added to each ten bits (at 5-bit resolution, this would be two samples of error $q_k$) to enable one bit error of the fourteen bits to be corrected (single-error correction, or SEC). As another example, five Hamming parity polynomial bits can be added to each ten bits, forming a 15-bit packet that enables reliable detection of two bit errors in the packet (dual error detection, or DED), though correction can only be performed when a single error is present. Additional parity bits can be added to further increase the detectable and/or correctable number of errors in each packet, at the cost of requiring additional channel bandwidth.

Box 306 represents a digital communications channel that includes a modulator to convert the ECC-encoded digital audio data $d_k$ into channel symbols, a transmitter to send the channel symbols across a wireless signaling medium, and a receiver-demodulator that receives potentially-corrupted channel symbols from the signaling medium and converts them to estimated digital audio data $\hat{d}_k$ that potentially includes bit errors. An ECC decoder 308 operates on the estimated digital audio data to detect one or more bit errors in each packet, correcting them when possible (e.g., when only a single error is present). When an error is corrected, the decoder can optionally flag the relevant audio error sample $\hat{q}_k$ as being corrected. When errors are detected but not correctable, the audio error samples from that packet may optionally be flagged as having an uncorrectable error.

An audio decompressor 310 reverses the operation of compressor 302 to reconstruct a stream of digital audio samples $\hat{\alpha}_k$ from the stream of audio error samples $\hat{q}_k$. A digital to analog converter 312 converts the stream of digital audio samples into an analog audio signal $\alpha_t$, which a speaker or other audio transducer 314 converts into a sound signal $S_t$.

In the presence of burst errors, the estimated audio error samples $\hat{q}_k$ are corrupted, frequently with more bit errors than the ECC decoder 308 can reliably detect. The decoder consequently fails to properly identify uncorrectable errors, doing so silently (i.e., without flagging erroneous error samples) or by improperly "correcting" samples to produce erroneous error samples that are flagged as corrected. Such mistakes prevent the audio decompressor from suppressing the resultant artifacts, which can create significant discomfort particularly when the compressor uses non-uniform quantization.

Figure 4:
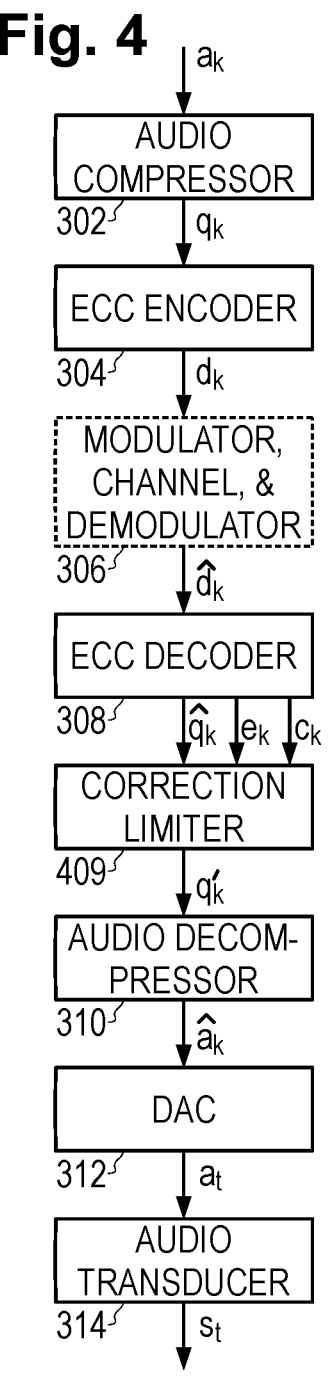
FIG. 4 is a data flow diagram for an illustrative audio communication system with a correction limiter.

FIG. 4 accordingly shows an improved audio communication system having a correction limiter 409 positioned between the ECC decoder 308 and the audio decompressor 310. The correction limiter evaluates corrected error samples, overwriting those that are determined to be outliers or otherwise atypical. The correction limiter may further overwrite any error samples that are flagged as uncorrectable. The correction limiter takes no action with respect to those samples that are not flagged as corrected or as uncorrectable; it simply forwards them to the audio decompressor. The overwritten samples are replaced with a sample derived from the envelope value or zero, as explained further below. With such values, the correction limiter has been found to suppress any noticeable audio artifacts at typical channel symbol error ratios ($\sim 10^{-3}$ or less).

Figure 5:
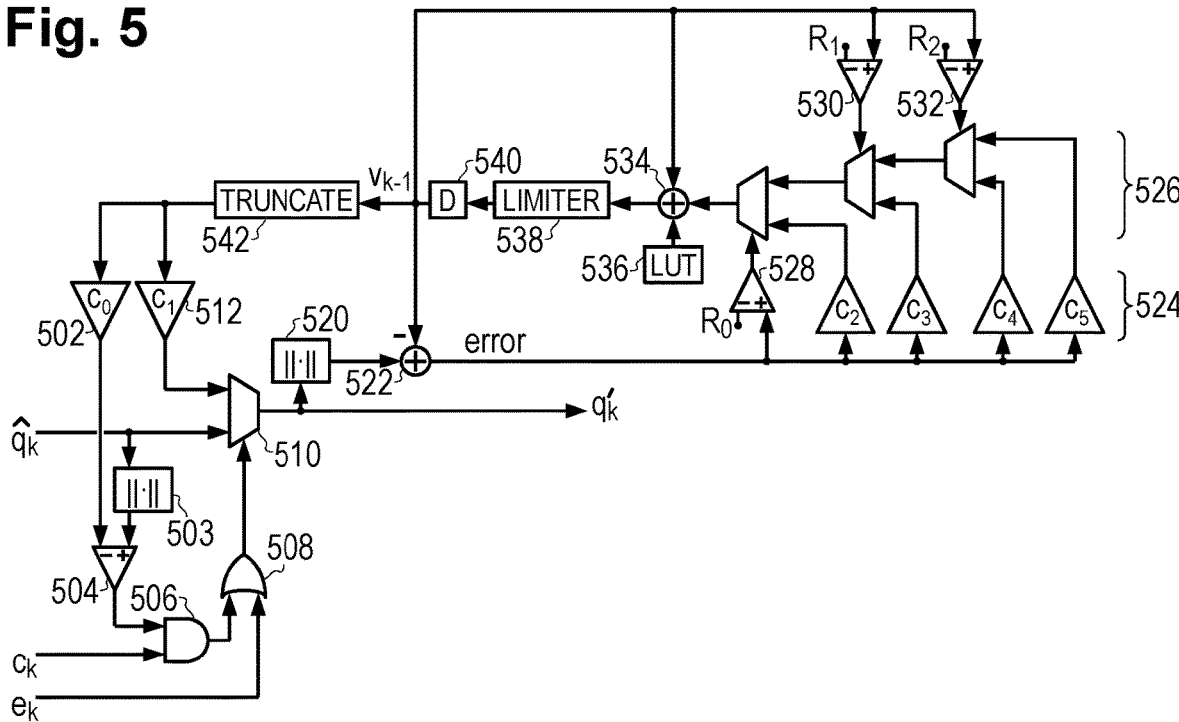
FIG. 5 is a schematic of an illustrative correction limiter.

FIG. 5 is a schematic of an illustrative implementation of correction limiter 409. The correction limiter receives a stream of ECC decoded audio error samples $\hat{q}_k$, each sample having an associated correction flag $c_k$ and an associated uncorrectable error flag $e_k$. The correction flag $c_k$ is asserted when the ECC decoder has corrected a bit error for that sample, and de-asserted otherwise. The uncorrectable error flag $e_k$ is asserted when the ECC decoder detects bit errors that it cannot correct for that sample, and is de-asserted otherwise. Based on these inputs, the correction limiter produces a correction-limited data stream $q_k'$ for the decompressor to operate on.

As will be discussed further below, components 520-538 recursively derive an envelope signal $v_k$ from the correction-limited data stream $q_k'$. A delay element 540 latches the envelope signal to make a previous envelope signal value $v_{k-1}$ available. A truncation element 542 represents the removal of some predetermined number of least significant bits which are unnecessary outside of the recursive filter loop.

An amplifier 502 amplifies the truncated envelope value for use as a comparison threshold. In the present example, amplifier 502 scales the envelope value by a programmable coefficient co, which in one illustrative implementation is 3/2, but other scale factors would also be suitable and can be evaluated empirically. A magnitude element 503 determines the magnitude of the current audio error sample $\hat{q}_k$, and supplies the result to a comparator 504. Comparator 504 asserts a comparison signal if the error sample magnitude exceeds the comparison threshold, representing a determination that the current audio error sample may be considered as atypically large. A logical AND gate 506 passes the comparison signal value only if the correction flag $c_k$ is asserted. A logical OR gate 508 asserts a selection signal if the uncorrectable error flag $e_k$ is asserted or if the current sample has been corrected and is atypically large.

Multiplexer 510 passes the current audio error sample $q_k$ unless the selection signal is asserted, in which case multiplexer 510 replaces the current audio error sample with a substitute value from amplifier 512. In at least some implementations, the multiplexer 510 only selects between the magnitude of the current audio error sample and that of the substitute value, in which case the sign of the current audio error sample $q_k$ is passed through unchanged to become the sign of the substitute value. Amplifier 512 provides the substitute value by scaling the previous envelope signal value $v_{k-1}$ with a programmable coefficient $c_1$. In this example, amplifier 512 scales the envelope signal by 1/4, but other factors would also be suitable and can be determined empirically. Alternatively, zero may be used as a substitute value.

A second magnitude element 520 determines the magnitude of the correction-limited data sample $q_k'$. A difference element 522 subtracts the previous envelope value $v_{k-1}$ the output of the magnitude element, producing an envelope error signal. A set of amplifiers 524 scale the error by different factors $c_2$-$c_5$ to be used to provide different adaptation rates for the envelope signal under different circumstances. A multiplexer arrangement 526 selects the desired amplifier (and thus the desired scale factor) based on signals from comparators 528, 530, 532.

Comparator 528 compares the envelope error to a first reference value $R_0$ (e.g., zero), causing a small scale factor $c_2$ (e.g., $2^{-11}$) to be selected when the error is less than the reference value. This arrangement may cause the envelope value to have a relative slow decay rate.

Comparator 530 compares the previous envelope value $v_{k-1}$ to a second reference value $R_1$ (e.g., 10% of the maximum envelope value), causing a relatively large scale factor $c_3$ (e.g., 3/2) to be selected when the envelope value is less than the reference value. For larger envelope values, comparator 532 compares the previous envelope value $v_{k-1}$ to a third reference value $R_2$ (e.g., 50% of the maximum envelope value), selecting between a moderate scale factor $c_4$ (e.g., 1) or small scale factor $c_5$ (e.g., 1/2). This arrangement provides enhanced attack rates making the adaptation more responsive when the envelope values are small, and attenuated attack rates make the adaptation more gradual when the envelope values are larger.

A summation element 534 adds the previous envelope value $v_{k-1}$ to the scaled error value selected by the multiplexer arrangement 526. A programmable register or lookup table 536 may supply an offset value to be included in the summation, thereby setting a minimum envelope value based on the audio compression rate, or other similar parameters that may vary based on system design or operating mode. A range limiter 538 limits the envelope value to a predetermined maximum value, which may be determined by the implementation of the recursive loop elements.

Figure 6:
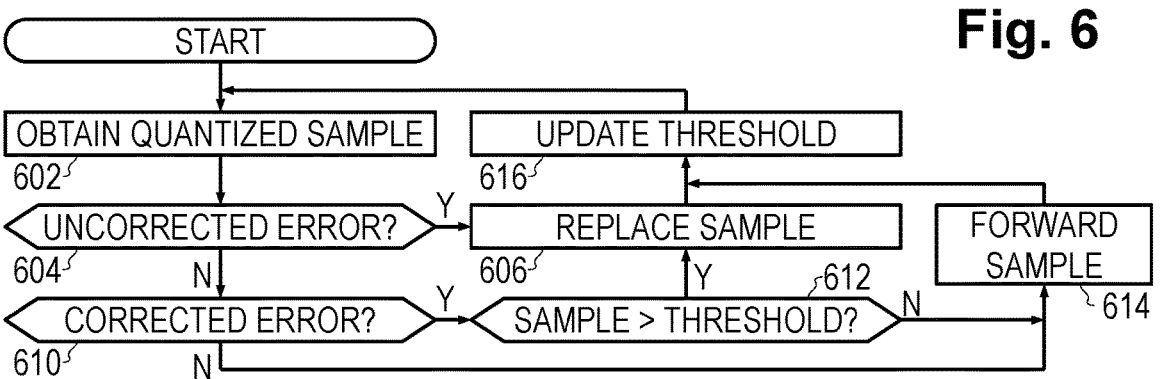
FIG. 6 is a flow diagram for an illustrative audio streaming method.

FIG. 6 is a flow diagram of an illustrative audio streaming method with artifact reduction. The audio device obtains a quantized audio error sample in block 602. In block 604, the device determines whether the current sample contains detected but uncorrected errors, and if so, replaces the sample in block 606. As previously discussed, the substituted error value may be a relatively small value such as zero or a small fraction of the previous envelope value.

If the current sample does not contain uncorrected errors, then in block 610, the device determines whether the sample contains a corrected error. If so, the device determines in block 612 whether the corrected sample is an outlier, e.g., whether it exceeds a threshold. If so, the device replaces the sample as described previously for block 606. If the current sample does not contain a corrected error (i.e., it is an error-free data sample) or is not an error-corrected data sample that is an outlier, the sample is forwarded in block 614 unchanged rather than being replaced. The forwarded or substituted samples are decompressed to derive a digital audio stream as described previously. In block 616, the audio device updates the threshold based on the forwarded or substituted samples, e.g., by updating an envelope value from which the threshold is derived.

The foregoing systems, devices, and methods require no additional FEC encoding or decoding complexity, yet provide significantly enhanced performance with only a small increase in silicon area requirements.

While the foregoing discussion has focused on audio streaming in the context of hearing aids, the foregoing principles are expected to be useful for many applications, particularly those involving audio streaming to or from smart phones or other devices low latency wireless audio streaming. Any of the controllers described herein, or portions thereof, may be formed as a semiconductor device using one or more semiconductor dice. Though the operations shown and described in FIG. 6 are treated as being sequential for explanatory purposes, in practice the method may be carried out by multiple integrated circuit components operating concurrently and perhaps even with speculative completion. The sequential discussion is not meant to be limiting. These and numerous other modifications, equivalents, and alternatives, will become apparent to those skilled in the art once the above disclosure is fully appreciated.

It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. The terms first, second, third and the like in the claims or/and in the Detailed Description or the Drawings, as used in a portion of a name of an element are used for distinguishing between similar elements and not for describing a sequence, either temporally, spatially, in ranking or in any other manner. It is to be understood that the terms so used are interchangeable under appropriate circumstances and that the embodiments described herein are capable of operation in other sequences than described or illustrated herein. Inventive aspects may lie in less than all features of any one given implementation example. Furthermore, while some implementations described herein include some but not other features included in other implementations, combinations of features of different implementations are meant to be within the scope of the invention, and form different embodiments as would be understood by those skilled in the art.

What is claimed is:

1. A low-latency audio streaming method that comprises:
   receiving packets of digital audio data;
   applying an error correction code decoder to obtain a data stream that includes error-corrected data samples and error-free data samples;
   providing a correction-limited data stream by replacing any of the error-corrected data samples that are outliers while forwarding the error-free data samples and any of the error-corrected data samples that are not outliers; and
   converting the correction-limited data stream into an audio signal.

2. The method of claim 1, wherein said providing includes:
   deriving a threshold from the correction-limited data stream; and
   replacing the error-corrected data samples that exceed the threshold.

3. The method of claim 2, wherein said deriving includes:
   calculating an error between a previous envelope value and a magnitude of a current data sample; and
   estimating a current envelope value as a weighted sum based on the error and the previous envelope value.

4. The method of claim 3, wherein the weighted sum includes a constant offset.

5. The method of claim 3, wherein the weighted sum scales the error by a factor that depends at least in part on the error.

6. The method of claim 3, wherein the weighted sum scales the error by a factor that depends at least in part on the previous envelope value.

7. The method of claim 6, wherein the factor increases as the previous envelope value decreases.

8. The method of claim 3, wherein said estimating includes limiting the weighted sum to a predetermined range.

9. The method of claim 3, wherein the threshold is proportional to the previous envelope value.

10. The method of claim 3, wherein the error-corrected data samples that exceed the threshold are replaced with a predetermined fraction of the previous envelope value.

11. A low-latency audio streaming device that comprises:

an error correction code decoder that produces a data stream having error-corrected data samples and error-free data samples;

a correction limiter that provides a correction-limited data stream by replacing any of the error-corrected data samples that are outliers and by forwarding the error-free data samples and any of the error-corrected data samples that are not outliers; and a decompressor that converts the correction-limited data stream into an audio signal.

12. The device of claim 11, wherein the correction limiter includes:

an envelope estimation circuit having:

a difference element to calculate an error between a previous envelope value and a magnitude of a current data sample; and a summation element to calculate a current envelope value based on the error and the previous envelope value; and a compare and select (CAS) circuit having:

a comparator that compares the current data sample to a threshold based on the previous envelope value; and a selector that replaces any of the error-corrected data samples that exceed the threshold.

13. The device of claim 12, wherein the current envelope is a weighted sum that includes a constant offset.

14. The device of claim 12, wherein the current envelope is a weighted sum that includes the error scaled by a factor that depends at least in part on the error.

15. The device of claim 12, wherein the current envelope is a weighted sum that includes the error scaled by a factor that depends at least in part on the previous envelope value.

16. The device of claim 15, wherein the factor increases as the previous envelope value decreases.

17. The device of claim 12, wherein the selector replaces the error-corrected data samples that exceed the threshold with a predetermined fraction of the previous envelope value.

18. A wireless system that comprises:

a first hearing aid for a first ear, the first hearing aid including:

a microphone to capture and digitize an input audio signal;

a transmit chain that compresses the digitized audio signal into packets of digital audio data with error correction code protection; and a first wireless transceiver that operates to transmit the packets of digital audio data; and a second hearing aid for a second ear, the second hearing aid including:

a second wireless transceiver that operates to receive said packets of digital audio data;

an error correction code decoder that produces a data stream having error-corrected data samples and error-free data samples;

a correction limiter that provides a correction-limited data stream by replacing any of the error-corrected data samples that are outliers and by forwarding the error-free data samples and any of the error-corrected data samples that are not outliers; and a decompressor that converts the correction-limited data stream into an audio signal.

19. The system of claim 18, wherein the correction limiter includes:

an envelope estimation circuit having:

a difference element to calculate an error between a previous envelope value and a magnitude of a current data sample; and a summation element to calculate a current envelope value based on the error and the previous envelope value; and a compare and select (CAS) circuit having:

a comparator that compares the current data sample to a threshold based on the previous envelope value; and a selector that replaces any of the error-corrected data samples that exceed the threshold.

20. The system of claim 19, wherein the current envelope is a weighted sum that includes the error scaled by a factor that depends at least in part on the error, and wherein the selector replaces the error-corrected data samples that exceed the threshold with a predetermined fraction of the previous envelope value.

* * * * *